(No Model.) 6 Sheets—Sheet 1.

L. C. EVANS.
CORN PLANTER.

No. 489,182. Patented Jan. 3, 1893.

Fig. 1.

WITNESSES:

INVENTOR
Louis C. Evans
BY
ATTORNEYS (No Model.) 6 Sheets—Sheet 3.

L. C. EVANS.
CORN PLANTER.

No. 489,182. Patented Jan. 3, 1893.

WITNESSES:
H. O. Oster.
Frank Watt

INVENTOR
Louis C. Evans
BY
ATTORNEYS

(No Model.)  6 Sheets—Sheet 5.

L. C. EVANS.
CORN PLANTER.

No. 489,182. Patented Jan. 3, 1893.

WITNESSES:
H. O. Oakr.
Frank Watt

INVENTOR
Louis C. Evans
BY Shhh H Shepherd
ATTORNEYS

UNITED STATES PATENT OFFICE.

LOUIS C. EVANS, OF SPRINGFIELD, OHIO.

CORN-PLANTER.

SPECIFICATION forming part of Letters Patent No. 489,182, dated January 3, 1893.

Application filed July 8, 1892. Serial No. 439,411. (No model.)

*To all whom it may concern:*

Be it known that I, LOUIS C. EVANS, a citizen of the United States, residing at Springfield, in the county of Clark and State of Ohio, have invented certain new and useful Improvements in Corn-Planters, of which the following is a specification.

My invention relates to improvements in corn planters, and it particularly relates to that class of corn planters in which the planting is adapted to be performed either by the driving wheel, so as to act in the nature of a drill, or by a check rower, so that one and the same machine may be adapted for various different forms of planting.

My invention consists in the various constructions and combinations of parts hereinafter described and pointed out in the claims.

In the accompanying drawings

Like parts are represented by similar letters of reference in the several views.

In the said drawings A A, represent what I will term the runner frame, and B B, the wheel frame. The planter frame carries the seed boxes A' A', and the planting shoes $A^2$ $A^2$, while the wheel frame carries the main axle B', and the wheels $B^2$ $B^2$, in a well known manner; the parts being hinged together at $a$, in the manner hereinafter more fully described.

The seed boxes A' A', are provided with the usual revolving dropping plates, adapted to be operated in a well known manner from beveled gears $b$, arranged on a transverse shaft $b'$, which extends across the runner frame and is journaled near each end in suitable bearings $b^2$, immediately below the respective seed boxes A'. This shaft $b'$, is revolved from the main axle B', by means of a driving chain $c$, which passes over a suitable sprocket wheel $c'$, on the main axle and one of a series of sprocket wheels $c^2$, $c^3$, $c^4$ and $c^5$, on the transverse shaft $b'$; the respective sprocket wheels $c^2$, $c^3$, $c^4$ and $c^5$ being formed of different diameters and arranged in series to secure a variation in the speed of the shaft $b'$, with reference to the main axle B'.

As before stated the wheel frame is hinged to the runner frame at $a$. To provide for adjusting the planter frame with reference to the wheel frame and at the same time to maintain the proper driving relations of the respective shafts $b'$, B', I form the hinged connection $a$, between the respective frames around the revolving shaft $b'$, by means of a bifurcated stand $a'$, secured to the runner frame and provided at the top with a sleeve or spool $a^2$, adapted to form a bearing for the shaft $b'$. On the wheel frame are bracket arms $d$, which extend upward and are provided with open bearings $d'$, adapted to embrace the spools $a^2$, on the bifurcated stand $a'$, and thus embrace the shaft $b'$ and be secured in this position by pins or bolts $d^2$, which close the open side of the open bearings $d'$.

To further provide for a lateral adjustment of the respective runner and wheel frames with reference to each other so as to permit the machine to adjust itself laterally to any unevenness or irregularity in the ground, I form the open bearings $d'$, elongated, so as to permit a limited vertical movement with reference to the spools $a^2$, which they embrace, thus permitting the runner frame to rise or fall at either side, furnishing within certain limits an independent movement of the planting shoes to adapt them to the uneven surfaces of the ground without any cramping of parts; the adjustment being independent of the wheel frame, while at the same time the raising and lowering of the runner frame with reference to the wheel frame is accomplished without changing the relative driving positions of the main axle and the revolving shaft $b'$.

The raising and lowering of the runner frame with reference to the wheel frame is accomplished in the usual manner by the pivoted cross bar C, connected at one side to the tongue D, preferably by means of a spring connection D'; the said cross bar being pivoted to the runner frame and provided at opposite ends with foot pieces $C'$ $C^2$, and at the center with a ratchet-plate $C^5$, adapted to be engaged by the hand-lever $C^4$; the hand-lever $C^4$, being further provided with suitable locking devices, by means of which it may be locked in different positions of adjustment to the stationary ratchet-plate $C^5$, secured to the wheel frame.

Figures 10, 18, 19, 20, 21:
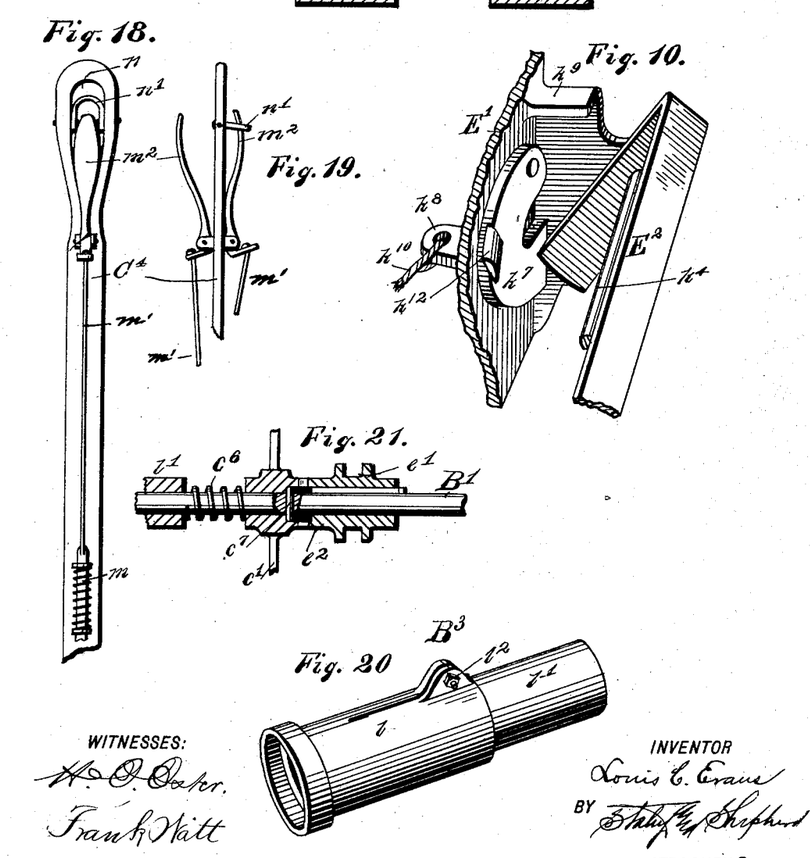
Figs. 18 and 19 are details of the lifting lever and connecting devices.
Fig. 20 is a detail of the extensible axle box or sleeve.
Fig. 21 is a detail of the driving clutch.
Figure 12:
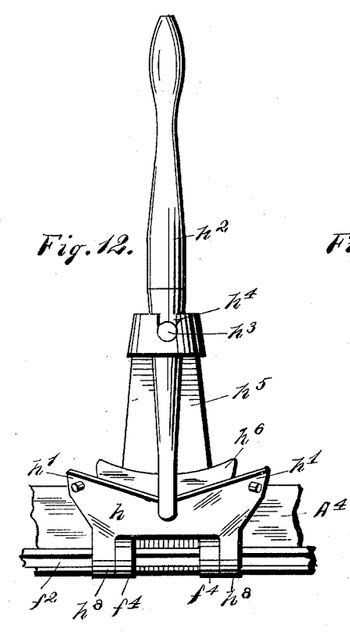
Figs. 12 and 13 are respectively a front and sectional elevation of the hand dropping mechanism.
Figures 13, 14, 15:
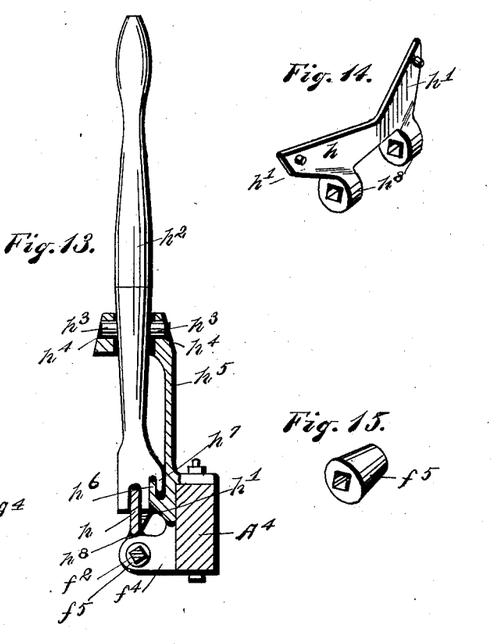
Figs. 14 and 15 are details of the same.
Figure 16:
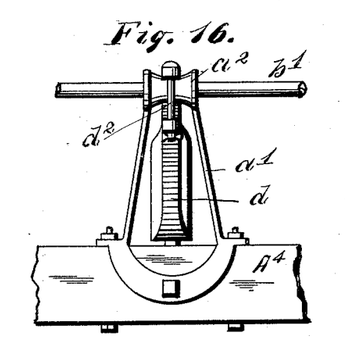
Figs. 16 and 17 are detail views of the frame connecting devices.
Figure 17:
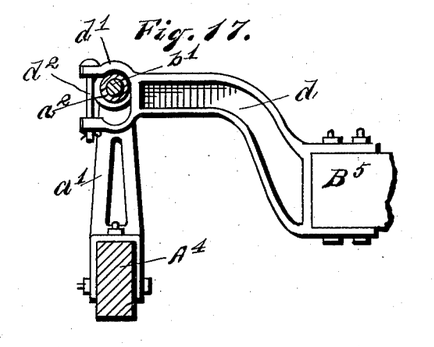

To provide for throwing the planting mechanism out of gear when the planting frame is elevated, I provide the lifting devices C, with a curved yoke or cam piece $e$, connected at each end to the cross-bar C, and curved downwardly thence upwardly so as to engage in a peripheral groove $e'$, in a clutch collar $e^2$, said clutch collar being secured on the main axle with a spline so as to revolve with said axle and yet move laterally thereon, and being further provided with a clutch face adapted to engage with a similar face on the hub of the driving sprocket wheel $c'$. The sprocket wheel $c'$, is held yieldingly against the clutch collar $e^2$, by means of a spring $c^6$, and is held against lateral movement on the shaft in the opposite direction by a pin $c^7$, which passes through said shaft and rests in a suitable chamber within the hub of said wheel, as shown in Fig. 21. The construction thus described permits the main axle B', to turn backward without revolving the sprocket wheel $c'$, while, by reason of the clutch collar and the cam, described, the said sprocket wheel is completely disengaged from the main axle when the runner frame is raised. By the constructions thus described the corn or other seed is discharged from the seed boxes by the revolving dropping plates, operated by the planter wheels, and drops into the respective shoes $A^2$. To provide for dropping the corn or other seed thus discharged into the shoes from the seed boxes, so as to form hills which shall be in line with the hills of the adjacent rows, I provide the said shoes with auxiliary valves $f$, pivoted at their ends to projecting arms $f'$, arranged on a transverse shaft $f^2$, the said valves being curved at their lower ends and projected through slotted openings $f^3$, in the rear of said tubes, the curved end resting against the back of the shoe so as to close the conduit leading from the seed boxes to the said shoe, near the lower extremity thereof.

On each side of the runner frame are the check rower heads E, provided with the usual forked vibrating lever $g$, which is connected by an adjustable connecting link $g'$, to a suitable arm $g^2$, on the outer extremity of the transverse shaft $f^2$, so that a vibration of the lever $g$, produces a rocking motion of the shaft $f^2$, which in turn produces an upward and backward movement of the valves $f$, thus opening the lower end of the conduit and permitting the seed collected therein to be dropped quickly to the ground, as the vibrating check lever $g$, is operated.

To provide for operating the rock-shaft $f^2$, and thus the auxiliary valves, by hand so as to drop the seed into hills without the aid of a check wire, I preferably employ on said rock-shaft vibrating cam plates $h$, preferably arranged on each side of a seat F, and between said seat and the seed boxes $A'$. These cam plates $h$, are provided with beveled angular wings $h'$, extending upwardly and outwardly from the center and adapted to be engaged by the bifurcated end of a handle $h^2$, having on each side projecting trunnions $h^3$, which engage in slotted bearings $h^4$, on a supporting stand $h^5$, arranged over the vibrating cam plate $h$. The respective cam plates stand in the same general plane as the shaft $f^2$, with the wings $h'$, thereof, at an angle to the axis of said shaft, so that a reciprocating motion of the handle $h^2$, produces an oscillating movement of the said shaft in opposite directions, so that a movement of the handle in either direction produces an opening and closing of the valves; the movement of the handle being in line with the axis of the rock-shaft and in the direction in which the operator faces in determining the proper point at which the seed is to be dropped, to bring it in check with the hills in the preceding rows. To insure the proper parallel movement of the handle $h^2$, and prevent lateral movement thereof, in operating the vibrating plates $h$, I preferably provide on the standard $h^5$, a curved hook-shaped bearing plate $h^6$, adapted to be engaged by an auxiliary hook-shaped finger $h^7$, on the handle $h^2$, thus causing the handle to travel positively in a vertical plane, so as to produce a positive movement of the vibrating cam-plate with reference thereto, the parts all being so constructed that the handle may be readily detached by raising the trunnions $h^3$, from their bearing seats and lifting the forked extremity of said handle through the encircling sleeve at the top of the supporting stand $h^5$. The rock-shaft $f^2$, is preferably made square, so that the respective projecting arms and fingers as well as the vibrating cam-plates, all being provided with square openings, may be slipped onto said shaft and operated therewith without any other fastening. The vibrating plates $h$, are each preferably bifurcated at the bottom forming projections $h^8$, through which the rock-shaft $f^2$, is adapted to extend. These projections are adapted to fit snugly on each side of stationary bearings $f^4$, on the planter frame. These stationary bearings $f^4$, are adapted to receive bearing sleeves $f^5$, formed with a central opening to correspond to the shaft $f^2$, and with an outer periphery to correspond to the perforations of the stationary bearings $f^4$, the sleeves being preferably slightly tapered as are the openings in the stationary bearings. In assembling the parts the cone-shaped sleeves are inserted in the stationary bearings, the bearing plate placed in line therewith with the projections on opposite sides of the stationary bearings, after which the rock-shaft is inserted through the parts, thus holding all the parts firmly together without any other means of connection. A similar construction is employed at the extremities of the rock-shaft, the bearing sleeves $f^5$, being held in position in the stationary bearings $f^4$, in this case, by the projecting arms $g^2$, which are pinned or otherwise secured onto the respective ends of the said rock-shaft.

It is desirable in some cases that means be provided for operating the dropping mechanism at intervals by the driver, for instance, at the end of the rows and in turning corners &c. To provide for this I preferably employ an extra projecting finger $f^6$, having a connecting rod $f^7$, adapted to be hooked into a projecting arm $f^8$, of a foot-lever $f^9$. This foot-lever $f^9$, is further provided with a projecting arm $f^{10}$, normally connected by a rod $f^{11}$, to a rock-shaft $f^{12}$, which carries scrapers $f^{13}$, adjacent to the carrying wheels B'. In the normal condition of the machine for operation, the connecting rod $f^7$, is disconnected, so that the foot-lever $f^9$, is adapted simply to operate the scrapers $f^{13}$. By simply disconnecting the rod $f^{11}$, and attaching the rod $f^7$, means are provided by which the auxiliary valves may be readily operated by the foot of the operator to drop the seed from the tubes at such intervals as is desired.

Figure 8:
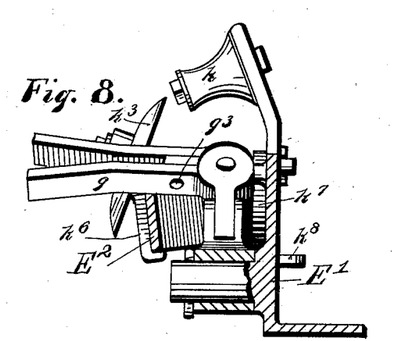
Fig. 8 is a transverse sectional view of the same, showing the manner of operating the parts to drop the check wire.
Figure 9:
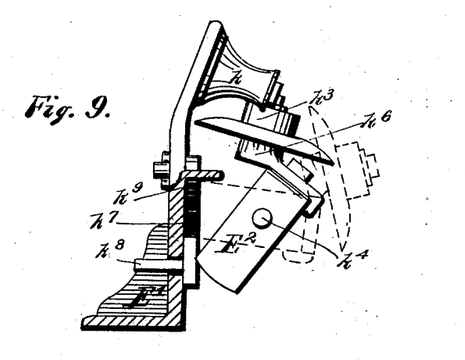

The check rower head E, consists essentially of a main frame E', and a hinged auxiliary U-shaped frame $E^2$. The respective heads are secured on opposite sides of the runner frame by connecting bolts $j$, which pass through suitable slotted openings $j'$, in the frame E', to permit the said heads to be adjusted forward or backward, to bring the parts in the proper position for operation, to secure the proper dropping of the seed. The frame E', carries the usual guiding pulleys $k$ $k'$, while the hinged U-shaped frame carries the auxiliary pulleys $k^2 k^3$, the check wire being adapted to pass under and over the respective pulleys in the usual way. The U-shaped frame $E^2$, consists simply of a flat bar of metal bent at right angles at the respective ends and pierced to receive the pivot rod $k^4$, which passes through the ends of said bar and through suitable lugs on the frame E'. The respective pulleys $k^2 k^3$, are journaled on suitable studs or fingers $k^5 k^6$, bolted or otherwise secured to the U-shaped swinging frame $E^2$. At one end of the frame E', I provide a pivoted latch $k^7$, having a projecting finger $k^8$, at right angles thereto. This latch $k^7$, in its normal position, is adapted to rest between the frame E', and the projecting end of the U-shaped frame $E^2$, as shown in Fig. 10; the projecting end of the swinging frame being of sufficient length to pass the frame E', when the latch $k^7$, is withdrawn and swings by gravity until the projecting end of said frame contacts with a lug $k^9$, on the frame E', thus bringing the parts to the position shown in Fig. 8, and thus releasing the check wire and permitting it to drop from the supporting pulleys $k^2 k^3$. The forked lever $g$, is preferably hinged, as shown at $g^3$, to permit it to swing laterally as the swinging frame $E^2$, is dropped, so that the wire may be readily disengaged therefrom.

Figure 1:
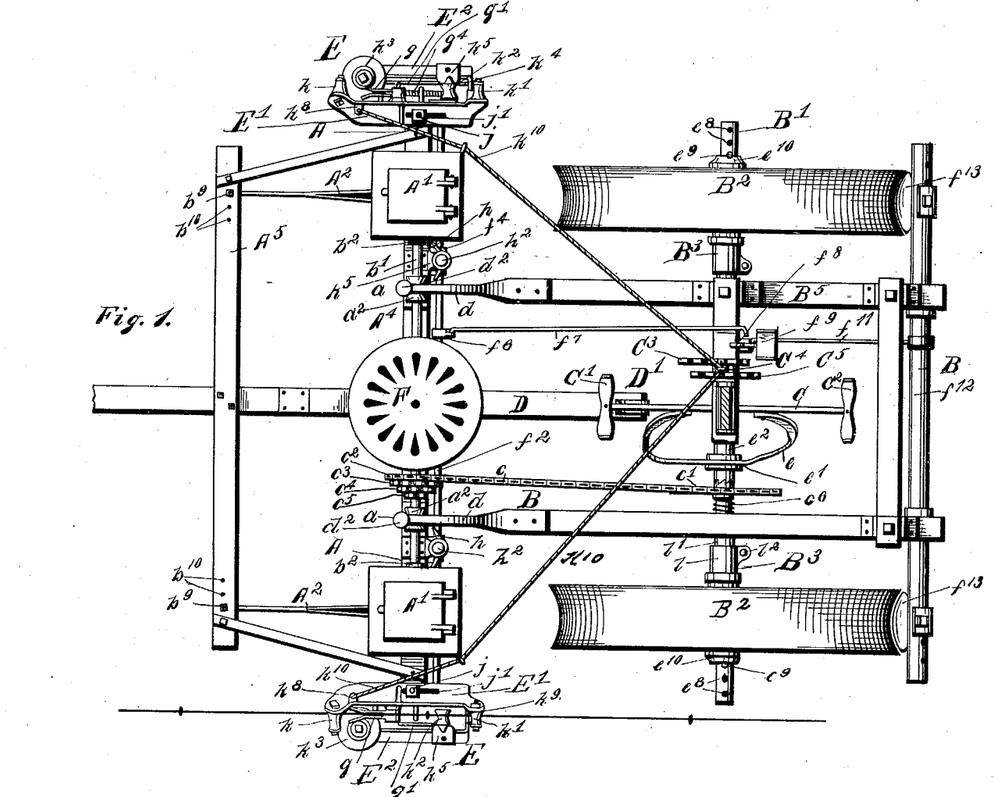
Figure 1 is a plan view of a planter embodying my invention.
Figure 2:
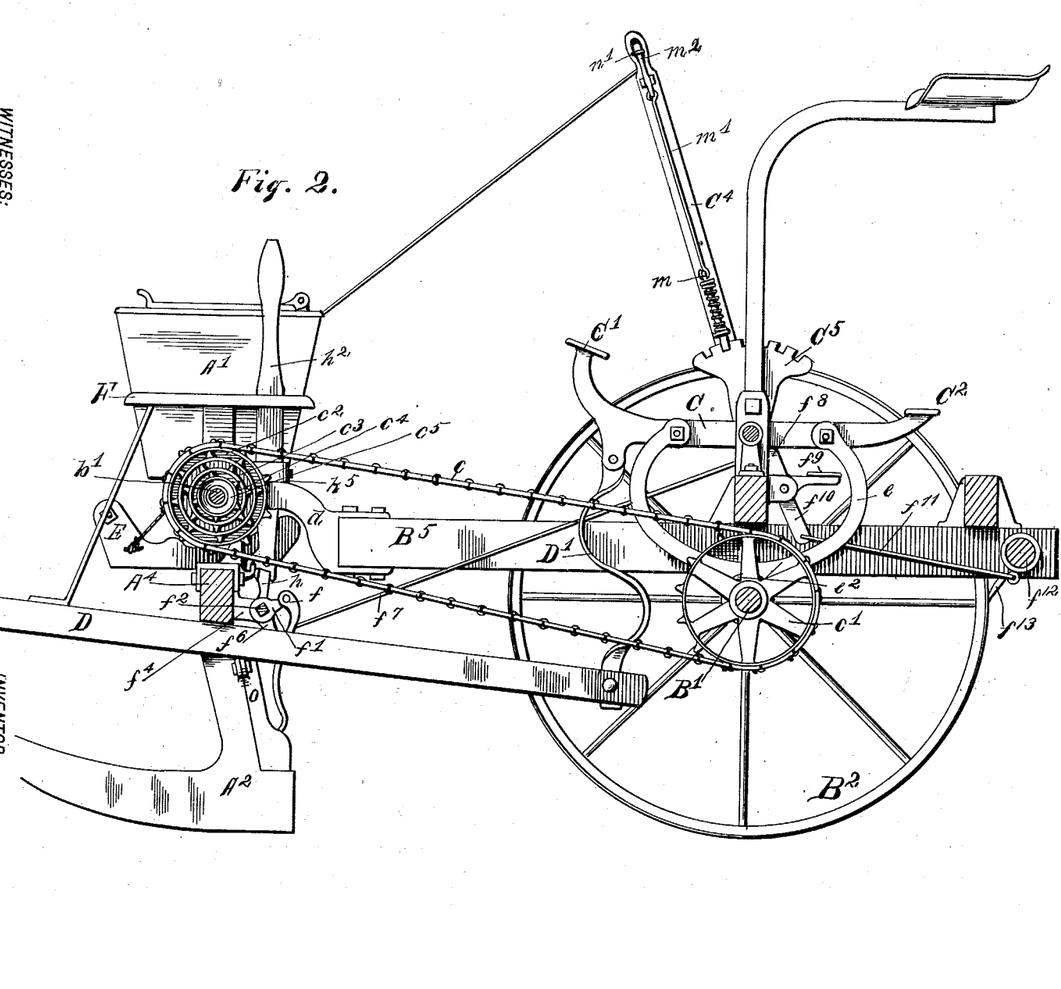
Fig. 2 is a partial elevation, partly in section, of the same.
Figures 3, 5:
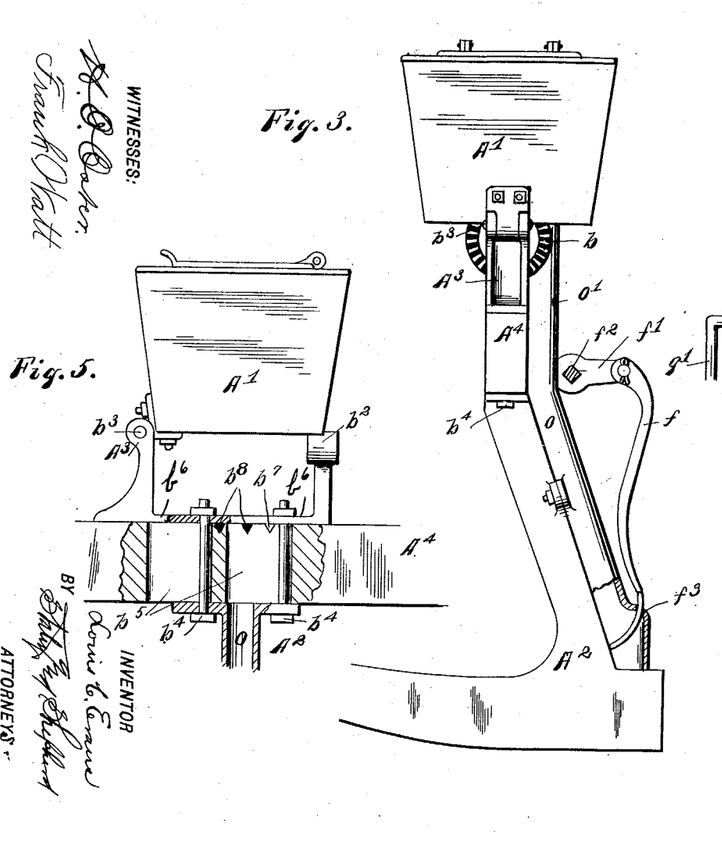
Figs. 3, 4 and 5 are detail views of a portion of the planting mechanism and the seed boxes.
Figure 4:
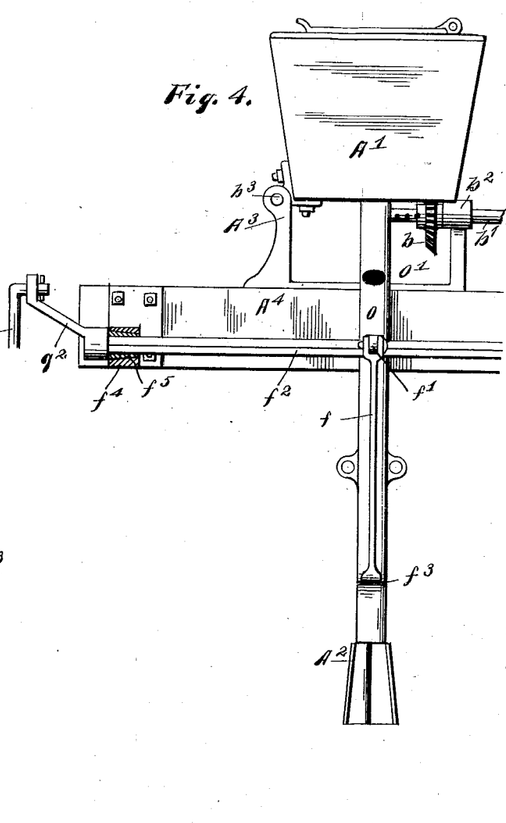
Figures 6, 7, 11:
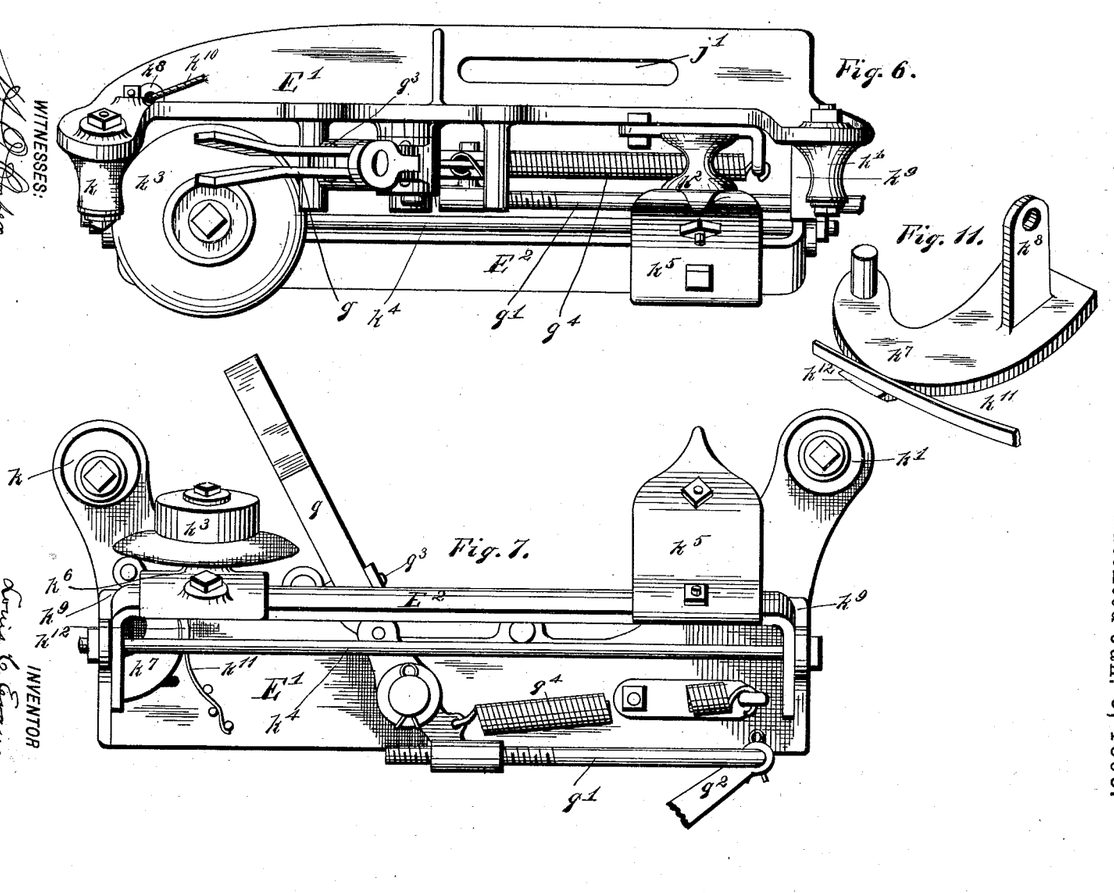
Figs. 6 and 7 are respectively a plan and elevation of the check rower device.
Figs. 9, 10 and 11 are detail views of the same.

It will be understood that as the machine is advanced the knots or projections on the check wire vibrate the lever $g$, thus operating the rock-shaft $f^2$; the lever, when released by the passing of the knots or projections, being returned to its normal position by a spring $g^4$, thus producing at each stroke of the lever an opening and closing of the valves $f$, in the seed tubes. The projecting finger $k^8$, on the latch $k^7$, is attached to a suitable cord or other connection $k^{10}$, which leads to within convenient reach of the operator, so that by drawing the rope or cord the latch is released, thus permitting the frame $E^2$, to drop by gravity and discharge the check wire. When released the spring latch $k^7$ is adapted to be returned to its normal position by a spring $k^{11}$, secured to the frame E', and resting in contact with said latch, a projecting lug or lip $k^{12}$, being preferably employed on said latch to hold the spring in proper position, as shown in detail in Fig. 11.

It will be understood that with a device as thus described two rows are planted simultaneously. To provide for adjusting the distance between the rows means are furnished by which the runner devices may be shifted on the planting frame and the wheels on the wheel frame. This I accomplish by supporting the seed boxes A', on a supporting stand $A^3$, which stand also carries the bearings $b^2$, for the shaft $b'$. The seed box is preferably hinged at $b^3$, to the said stand, the stand being connected to the frame beam $A^4$, by bolts $b^4$, which pass through slotted openings $b^5$, in one of the frame timbers, said bolts being also adapted to pass through ears or flanges $b^6$, on the planting shoe $A^2$, and thus hold the said parts in their proper relative positions. The stand $A^3$, is further held against lateral movement on the frame by small projecting ribs $b^7$, which engage in corresponding transverse grooves $b^8$, in the frame. Means are thus provided for shifting the planting shoes and seed boxes on the runner frame to secure different widths between the rows. The arms $f'$, to which the valves $f$, are connected, being mounted loosely on the rock-shaft $f^2$, may be adjusted to any position on said shaft. The front ends of the planting shoes $A^2$, are connected to a cross-bar or beam $A^5$, forming part of the runner frame, by bolts $b^9$, adapted to pass through one of a series of openings $b^{10}$, which correspond to the transverse grooves $b^8$. To provide for correspondingly adjusting the planting wheels $B^2$, I construct the axle $B'$, with a series of openings $e^8$, at each end, adapted to receive a pin or cotter $e^9$, which supports a collar $e^{10}$, located at the end of the wheel hub. The wheel is held against lateral movement on the axle in the opposite direction by an extensible sleeve $B^3$, formed in two parts: $l\ l'$, the part $l'$, being adapted to fit in the part $l$, which is slotted at one side and adapted to be clamped about the part $l'$, by a clamping bolt $l^2$, to hold the parts in different positions of adjustment. These extensible sleeves rest between the inner ends of the wheel hub and the axle bearings which are secured to the frame beams $B^4\ B^5$. Means are thus provided by which the seed boxes and their attached devices, as well as the covering wheels, can be shifted laterally to plant rows of different widths.

As before stated the lifting lever $C^4$, is adapted to engage on opposite sides with ratchet stands $C^3\ C^5$, spring bolts $m$, connected by connecting rods $m'$, two thumb-latches $m^2$, being employed in the usual way on the lifting lever to accomplish this result. To provide for holding the lever out of engagement with either of the said ratchet plates, I construct the handle of the lifting lever $C^4$, with an opening $n$, in which is pivoted a loop $n'$, adapted to swing through the opening $n$, and engage with either of the thumb-latches $m^2$, on the opposite sides of said lever. By this construction the lever may be either disengaged from the lifting frame or from the stationary ratchet stand and held out of engagement therewith by means of this fastening loop, an adjustment which is frequently desirable in passing over uneven ground or otherwise.

The tube or conduit $o$, through which the seed passes from the seed boxes to the planting shoe, I preferably provide with an opening $o'$, which, while not interfering with the dropping seed, permits the operator to see whether or not the seed is passing from the seed box into the planting shoe.

It is thought that the operation of the device will be thoroughly understood from the above description. The grain is fed from the seed box by the revolving dropping mechanism operated by the wheels, and, if desired, may be passed directly through the planting shoes to the ground by lifting the valves $f$, and securing the rock-shaft in the proper position to hold them out of the tubes. When used as a check rower the grain is collected within the planting shoe and discharged at intervals by the auxiliary valves $f$, operated by the knotted check wire and the forked lever connected through the rock-shaft to said valves, or the valves may be operated at suitable intervals by the hand-lever operating on the vibrating cam-plate on the rock-shaft, or they may be further operated by the foot of the operator by disconnecting the scraper shaft and connecting the rock-shaft to the foot-lever on the wheel frame. By the employment of the sprocket wheels of different sizes on the revolving shaft $b'$, a greater or less number of grains may be discharged from the seed boxes at each revolution of the wheel, thus furnishing the means for regulating the quantity planted in the respective hills, when the check device is employed. By having the seed boxes hinged to the supporting stand, as described, means are provided by which said boxes may be readily discharged to change the plates, as desired, for planting different kinds of seeds.

Having thus described my invention, I claim:

1. In a seed planter, the combination with the runner frame and the shoes thereon, a rock shaft supported in suitable bearings on the runner frame, vibrating fork levers connected to said rock shaft, and projecting fingers on said rock shaft, valves connected to said fingers, said valves being provided with a curved extremity adapted to pass through bearings formed in the walls of the shoe, whereby the said valve is caused to move upwardly and outwardly by a vibration of said rock shaft, substantially as and for the purpose specified.

2. In a planter, the combination with the planting shoes and the reciprocating valves therein, of a rock-shaft extending across the planting frame and connected to said valves, vibrating cam-plates on said rock-shaft, a pivoted arm adapted to engage said cam-plates, said arm being provided with a hook-shaped projection which engages on a stationary bearing plate, substantially as specified.

3. In a planter, the combination with the planting shoe and the reciprocating valves therein, a square rock-shaft having projecting fingers connected to said valves, cone-shaped thimbles adapted to fit on said rock-shaft, stationary bearings on the planting frame to receive said cone-shaped thimbles and form bearings for said shaft, substantially as specified.

4. In a planter, the combination with the planting shoes and the reciprocating valves therein, a square rock-shaft having projecting fingers connected to said valves, vibrating cam-plates having projections adapted to fit over said shaft, said vibrating plates being provided with wings extending outwardly and upwardly from the center at an angle to said shaft, a stationary bearing or bearings between the projections of said vibrating plate, and cone-shaped sleeves in said stationary bearings having square openings to receive said shaft, substantially as specified.

5. In a planter, the combination with the dropping mechanism, of a square rock-shaft connected to said dropping mechanism, stationary bearings having cone-shaped sleeves adapted to receive said rock-shaft, a vibrating plate having projections to fit on said rock-shaft, located on either side of said stationary bearings, said vibrating plate being provided with wings at an angle to the axis of said shaft, a hand-lever journaled in suitable bearings in a supporting stand and provided with a forked extremity adapted to embrace said vibrating plate, substantially as specified.

6. The combination with the square rock-shaft and the valves connected thereto, a bifurcated vibrating plate, the forked extremities of which are perforated to receive said square shaft, a stationary bearing or bearings located between the forked extremities of said plate and provided with cone-shaped bearing sleeves adapted to fit over said shaft, a forked hand-lever supported in a suitable stand and adapted to engage said vibrating plate, said plate, stationary bearings and sleeves being held together by inserting said shaft through the respective parts, substantially as specified.

7. In a planter, the combination with the rock-shaft and the dropping mechanism attached thereto, a hand-lever pivoted in suitable bearings in a supporting stand, a vibrating cam-plate on said shaft, adapted to be engaged by said hand-lever, and a bearing plate on said supporting stand, a hook-shaped projection on said hand-lever adapted to engage said bearing plate, substantially as specified.

8. In a planter, a runner frame and a wheel frame, a revolving axle on said wheel frame and a revolving shaft on said runner frame, a driving connection between said axle and shaft, supporting stands for said shaft on said runner frame having sleeve-shaped bearings in which said shaft revolves, projecting brackets on said wheel frame having slotted openings adapted to fit over the sleeve-shaped bearings on said runner frame and thus form a hinged connection about said shaft which shall permit a limited independent vertical movement of the relative parts, substantially as specified.

9. The combination with the planting frame having the revolving planting shaft supported in U-shaped bearing supports having spool-shaped sleeves about said shaft, a wheel frame connected to said planting frame by projecting brackets having elongated open bearings adapted to fit over said sleeves, and a driving connection from the main axle on said wheel frame to the rotating shaft on said planting frame, substantially as specified.

10. In a planter, the combination with the planting shoes and the valves therein, a rock-shaft for operating said valves, a pivoted vibrating lever connected to said rock-shaft, a supporting frame or head for said lever, guiding sheaves on said head at the front and rear of said lever, a hinged frame for supporting one or more of said guiding sheaves, a pivoted latch for engaging said hinged frame, and said frame being formed U-shaped with projecting ends adapted to limit the movement of said frame when disengaged by said pivoted latch, substantially as specified.

11. In a planter, a check rower head consisting of a stationary frame and a U-shaped swinging frame, guiding sheaves on said stationary frame and supporting sheaves on said U-shaped swinging frame, a swinging latch adapted to contact with the lower extremity of said swinging frame and retain the same in its normal position, said pivoted latch being provided with a projecting finger extending through a slotted opening in the stationary frame, and a connection from said finger to operate said latch, substantially as specified.

12. In a planter, a check rower head consisting of a stationary frame and a U-shaped swinging frame, the vibrating forked lever on said stationary frame formed in two parts and pivoted so as to swing at right angles to said frame, a pivoted latch on said main frame adapted to normally rest between said main frame and the projecting end of said U-shaped frame, and means, substantially as described, for operating said latch to disengage said swinging frame, substantially as specified.

13. In a planter, a planting frame and a wheel frame hinged thereto, a lifting lever on said wheel frame adapted to raise and lower said planter frame, a main axle on said wheel frame and a driving wheel on said axle, a driving connection from said axle to a revolving shaft on said planter frame, a movable clutch on said axle adapted to engage and disengage said driving wheel, and a curved cam-shaped loop or yoke connected to said lifting lever and operating on said movable clutch, substantially as and for the purpose specified.

14. The combination with the main axle, the driving wheel thereon and the movable clutch adapted to engage and disengage said driving wheel, a pivoted vibrating frame having a loop shaped cam secured thereto, adapted to engage in a peripheral groove in said clutch, whereby an oscillating movement of said pivoted frame produces a lateral movement of said clutch, substantially as specified.

15. In a planter, a frame and supporting stands on said frame having the seed boxes hinged thereto, planting shoes under said seed boxes, said shoes and stand being connected to the frame by fastening bolts which extend through slotted openings in said frame, a transverse lug or projection on said supporting stand, a series of transverse grooves or notches in said frame adapted to receive said lug or projection when said seed boxes and shoes are moved to different positions with reference to said frame, substantially as specified.

16. In a planter, the combination with the main axle and the supporting wheels thereon, means for shifting said wheels laterally on said axle, and extensible sleeves on said axle for holding said wheel in different positions of adjustment, one of said sleeves being adapted to telescope into the other, the other of said sleeves being formed with a split bearing and clamping bolt to clamp the inner sleeve, substantially as specified.

17. In a planter, the combination with the lifting lever provided on opposite sides with thumb-latches, adapted to respectively engage and disengage with ratchet stands, said lever being provided with an open handle having a pivoted loop adapted to swing through said opening to engage either of said thumb-latches, substantially as specified.

18. The combination with the lifting lever, of the thumb-latches on opposite sides thereof and the ratchet stands adapted to be engaged by suitable mechanism controlled by said thumb-latches to engage and disengage said lever with said stands, said lifting lever being provided with an open handle having a pivoted loop $n'$, in said opening adapted, when turned to different positions, to engage and hold either of said thumb-latches, substantially as specified.

In testimony whereof I have hereunto set my hand this 25th day of June, A. D. 1892.

LOUIS C. EVANS.

Witnesses:
A. N. SUMMERS,
PAUL A. STALEY.